INVENTOR.
CLARENCE W. USKAVITCH
BY Wade Koontz
ATTORNEY and
Alfred L. Brody
AGENT Sept. 29, 1959 C. W. UŠKAVITCH 2,907,027

COMPUTER CONTROL CIRCUITRY

Filed Nov. 16, 1956 4 Sheets-Sheet 2

INVENTOR.
CLARENCE W. USKAVITCH

BY Wade Koontz
ATTORNEY

Alfred L. Brody
AGENT

INVENTOR.
CLARENCE W. USKAVITCH
BY Wade Koontz
ATTORNEY
Alfred L. Brody
AGENT

Sept. 29, 1959 C. W. USKAVITCH 2,907,027

COMPUTER CONTROL CIRCUITRY

Filed Nov. 16, 1956 4 Sheets-Sheet 4

INVENTOR.
CLARENCE W. USKAVITCH
BY Wade Koontz
ATTORNEY
and Alfred L. Brody
AGENT United States Patent Office 2,907,027

Patented Sept. 29, 1959

2,907,027

COMPUTER CONTROL CIRCUITRY

Clarence W. Uskavitch, Lexington, Mass., assignor to the United States of America as represented by the Secretary of the Air Force Application November 16, 1956, Serial No. 622,720

5 Claims. (Cl. 343—17.1)

The invention described herein may be manufactured and used by or for the United States Government for governmental purposes without payment to me of royalty thereon.

The present invention relates to computing and particularly to methods and apparatus for utilization of computing techniques for the purpose of controlling signal reception in electronics communication systems.

In a radar system, because the amplitude of the video noise from the receiver varies, it is most desirable to have some means whereby the quantized noise, and consequently, the video noise is maintained substantially constant, even though the video noise level from radar receiver may vary.

One practical application of the computer control circuitry of my present invention is shown herein as an automatic clip control for the video noise level in a radar system. It is the purpose of such an automatic clip control to prevent the video from being clipped too high, thereby retaining weak targets, or from being clipped too low, thereby avoiding overload of the video with noise.

In more specific terms, the present invention relates to computer control circuitry including a clipper-quantizer circuitry for converting analogue video data to digital pulses, and finally feeding back said digital pulses to regulate the clip level of the subsequently received analogue video data.

As is well known in the art, radar systems are subject to amplitude variations due to a multiplicity of factors, such as local oscillator changes, crystal current changes, and changes in receiver gain. Since these factors cannot be easily eliminated, the automatic clip control of my present invention changes the clip level in such a way that the quantized noise and, consequently, the video noise is maintained constant, as nearly as possible, with fluctuations in the video noise level.

One feature of the present invention is unique computer circuitry whereby video analogue data is converted to digital pulses, which in turn regulates subsequently received video analogue data, in accordance with the character of the previously received video analogue data.

Another feature of the present invention is computer control circuitry provided with a clipper component for converting the clipped video analogue data to digital pulses and finally regulator means for regulating the clipping level of subsequently received input video analogue data in accordance with the frequency of said digital pulses.

The present invention itself, both as to its organization and manner of operation, together with further features and advantages thereof, may best be understood by reference to the following description taken in connection with the accompanying drawings in which.

Figure 1:
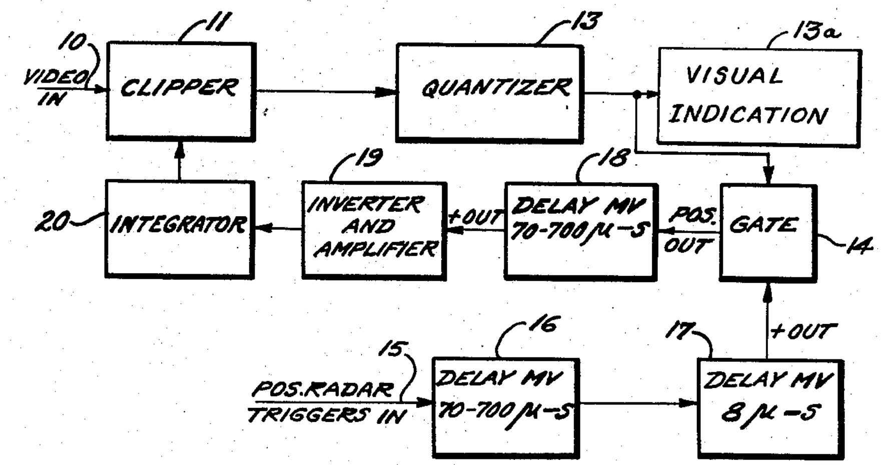
Fig. 1 is a schematic block diagram of the components which make up the computer control circuitry, as used as an automatic clip control, in conjunction with a radar system.
Figure 3:
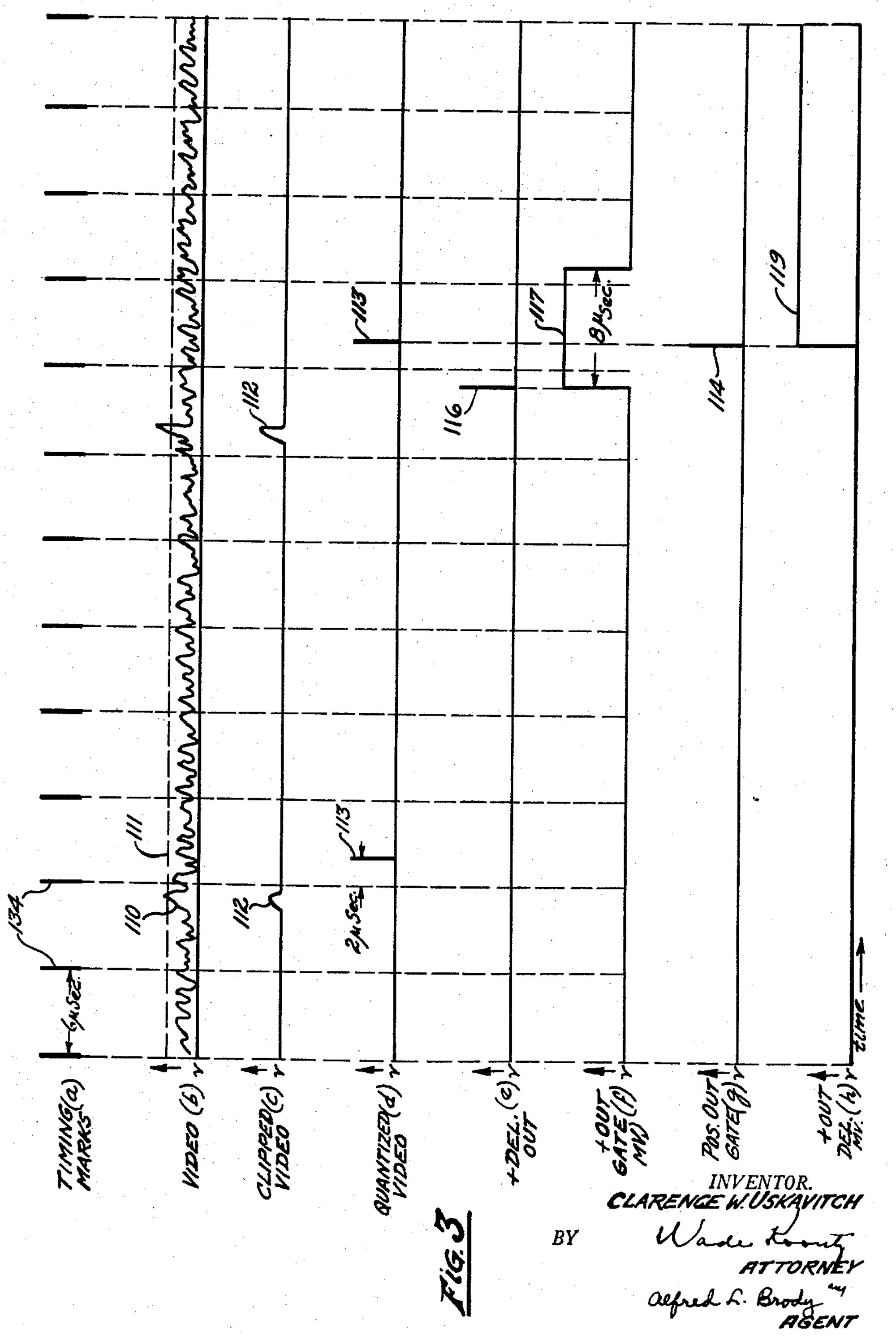
Fig. 3 illustrates graphically the nature of the wave-shapes output signals, as plotted against time, of several of the components, of the block diagram of Fig. 1.
Figure 4:
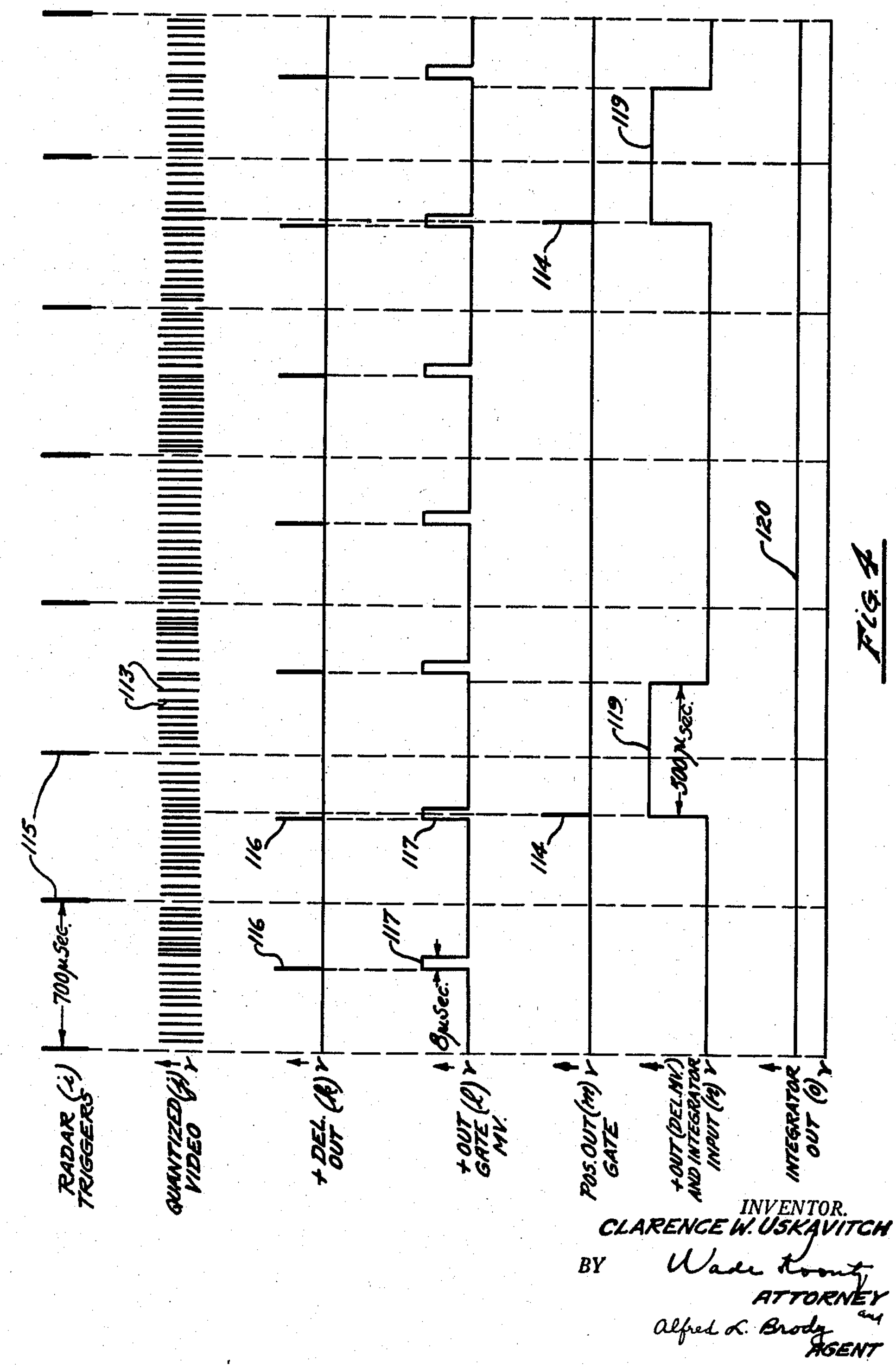
Figure 5:
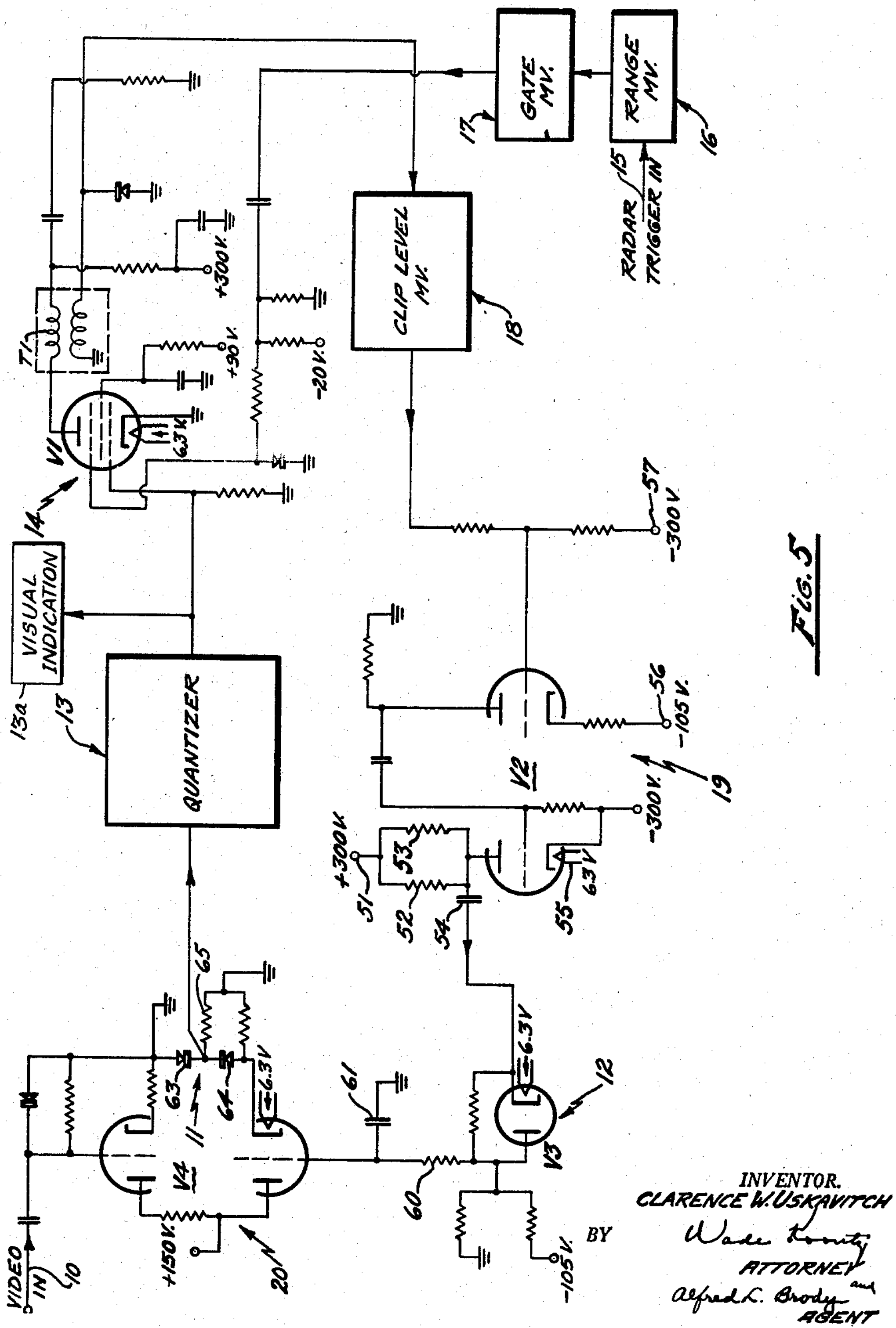

Fig. 4 illustrates graphically the nature of the wave-shapes of output signals as plotted against time, of some of the same wave-shapes as shown in Fig. 3, but on a condensed time scale, as well as wave-shapes of output signals of other components of Fig. 1; and Fig. 5 is a part circuit and part block diagram of all the components which make up the automatic clip control, as shown in block form in Fig. 1.

In the automatic clip control circuit for a radar system, video input 110 signals are applied at 10, as shown in Fig. 1, to the clipper component 11. Said video input signals 110 which are a composite of noises and desirable signals, are shown in graph (*b*), in Fig. 3.

After the clipper component 11 clips the video input signals 110 to the clip level 111, as regulated by circuitry as will be later described, the clipped video will take the wave form of graph (*c*). The clipped video is then applied to the quantizer 13.

Figure 2:
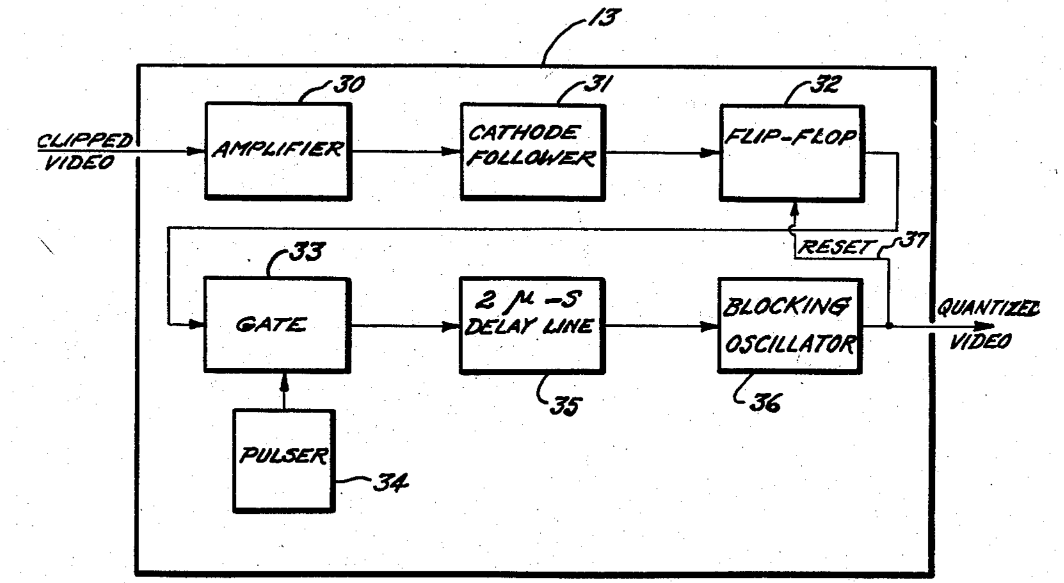
Fig. 2 is a schematic block diagram of the components which make up the "quantizer," as shown schematically in Fig. 1.

The quantizer 13 produces output pulses 113, shown in graph (*d*) of Fig. 3, for each clipped peak 112, as shown in graph (*c*). The components of the quantizer 13, shown in Fig. 2, include an amplifier 30 and a cathode follower 31 which amplifies and inverts, respectively, the clipped video from clipper 11 to provide positive triggering of a flip-flop 32. A gate 33, receives through one of its grids, timing mark pulses 134 from pulser 34, which are spaced every 6$\mu$ seconds, as shown in Fig. 3, graph (*a*). By positively triggering flip-flop 32, gate 33 will open and permit the next timing mark pulse 134 through. Each timing mark pulse 134 which gets through the gate is delayed 2$\mu$ seconds by delay line 35 and then is regenerated by means of a blocking oscillator 36. The output of blocking oscillator 36 then will take the form of the quantized video pulses 113 as shown in graph (*d*) of Fig. 3. The quantized video pulses 113 also are fed back through line 37 to reset flip-flop 32, so that said flip-flop 32 may be ready for another positive triggering action.

The quantized video pulses 113 then are transmitted to a conventional radar-scope, or other video display apparatus, indicated by block **13*a* in Figs. 1 and 5, for visual evaluation, as well as to grid 1 of a tube V1 of gate 14, as shown in Fig. 5. In the present embodiment a 7AK7 gate tube is used for V1, however another tube of similar characteristics may be used. The quantized video pulses 113 are then gated by a range delay multivibrator 16 and gate delay multivibrator 17**.

The range delay multivibrator 16 is fed by a positive radar trigger input pulse 115 every 700$\mu$ seconds at 15, as shown in Figs. 1 and 4(*i*). It is noted that the time scale of Fig. 4 has been considerably condensed, as compared to Fig. 3, because the duration and spacing of the pulses thereon are for considerably longer intervals of time than the pulses shown in Fig. 3.)

The range delay multivibrator 16 delivers range pulses 116, as shown on Fig. 3 graph (*e*) and Fig. 4, graph (*k*), at 500$\mu$ seconds intervals (depending upon the setting of the clip level multivibrator 18, as subsequently will be more fully described). Each range pulse 116 is transmitted to the gate multivibrator 17, which initiates a gate multivibrator pulse 117, of 8$\mu$ seconds duration, as shown in Fig. 3(*f*) and Fig. 4(*l*). The output pulses 117 of gate multivibrator 17 then are fed to grid 3 of tube VI of gate 14, and if a quantized video pulse 113 occurs in synchronism with one of the 8$\mu$ second gate multivibrator pulses 117, the gate VI will be "opened" to allow a positive output pulse 114 to be generated from the plate of tube VI of gate 14, through the transformer T1 for inversion, and finally said pulse 114 will trigger clip level multivibrator 18, as shown in Figs. 1, 3(*g*) and 4(*k*) and 5.

Upon triggering clip level multivibrator 18 with a pulse 114 from gate 14, a clip level multivibrator pulse 119, roughly of the order of 500$\mu$ seconds duration, depending upon the setting of the clip level multivibrator 18, will occur on the average. The clip level multivibrator pulses will occur every 7000$\mu$ seconds or one every ten radar triggers. It is noted in Fig. 4, that for convenience of illustration, five radar triggers 115 are shown for each clip level multivibrator pulse 119, however, a ten to one ratio, of triggers 115 to pulses 119, is preferred on the average and is determined by the clip level setting in this particular application.

The positive output pulses 118 of multivibrator 18 are fed to inverter and amplifier stage 19 which restores pulses 118 to their original phase, as well as amplifies said pulses 118 by means of a 6SN7–GTA tube, designated as V2 in Fig. 5.

The output of stage 19 is applied as pulses 119 to the integrator 20, as shown in Fig. 1, where said pulses are integrated using a 20 seconds' time constant. The integration produces a D.C. voltage 120, as seen in Fig. 4(*o*), is roughly proportional to the frequency of the quantized noise pulses 113, and said D.C. voltage 120 is fed back to the clipper 11 to regulate the clip level 111 of subsequently received video input signals.

The inverter and amplifier stage 19, as shown in Fig. 5, have been designed to provide the maximum amount of gain in the feedback path comprising clipper 11, quantizer 13, gate 14, clip level multivibrator 18, amplifier and inverter stage 19, integrator 20 and back to clipper 11. In a preliminary study, a D.C. amplifier was used to amplify directly the integrated output of the delay clip level multivibrator 18, without resorting to other amplification; however, amplification of the output of multivibrator 18 before integration was considered more desirable.

To obtain the necessary gain the clip level multivibrator output pulses 118 must be amplified to pulses of at least 500 volts in amplitude. Consequently, the amplifier of stage 19 used a 600-volt plate supply, or as shown in Fig. 5, +300-volts at 51 on the plate of the amplifier component of stage 19 and —300-volts on the cathode of said component. In addition, only 75K ohms or two 150K ohms resistors 52 and 53, placed in parallel, can be used for the load resistance because of the load effect of integrator 20. The output coupling capacitor 54, is relatively large (e.g. 0.15$\mu f$. and 400 volts), in order to overcome the interaction of the elements of stage 19. The negative output of multivibrator 18 is not large enough to cut off the amplifier of stage 19 due to its high plate supply, and since positive pulses are required for integration to provide the correct polarity for the clipper 11, it was necessary to add the inverter of stage 19 to operate on the large positive output from multivibrator 18.

The 600-volt plate voltage of the amplifier of stage 19 necessitates the use of a 6SN7–GTA tube, which is designated in Fig. 5 as V2. However, since the rated maximum heater cathode voltage is 200 volts, the heater 55 is placed at —300 D.C. volts. Hence, the cathode of the inverter of stage 19 must also be at negative voltage of —105 volts, as shown at 56, and the inverter grid bias must be adjusted to —300 volts, as shown at 57. Direct coupling must be used between multivibrator 18 and the inverter of stage 19 because capacitor coupling blocks the operation of the feedback when the frequency of the quantized noise drops off.

When the automatic clip control circuit is in operation, the pulses are of the following orders or magnitudes: clip level multivibrator output, from —100 to 0 volt; inverter grid to cathode, from —60 to —1 volt; inverter plate, from 0 to —70 volts; and amplifier output, from —250 to +300 volts.

As shown in Fig. 5, the amplifier output is clamped to approximately —20 volts, by means of clamping stage 12 including a 6W4 diode, designated as tube V3 before being integrated. This procedure makes the integrated output signals 120, as seen from the output of the cathode-follower clipper, the correct magnitude for clipping the video input 110 when the output of the clip-level multivibrator 18 is adjusted. The 6W4 diode is used for this purpose because of the high inverse plate and heater cathode voltage involved, which is in the order of 550 volts.

As can be seen in Fig. 5, the integrator 20 comprises a simple RC filter including resistor 60 and capacitor 61, which feeds into the grid of cathode follower comprising half of double triode tube 6SN7. Tube 6SN7 is designated as V4 in Fig. 5. No grid resistor can be placed across the capacitor 61 (nor can an electrolytic capacitor be used) because of the increased discharge and subsequent loss of gain.

The clipper 11 comprises two IN34A clipping diodes, designated as 63 and 64, and said diodes are terminated in a 5100 ohm resistor 65, the value of which is determined by the forward and back resistances of said diodes. The video input 10 is fed into a cathode follower which comprises the remaining triode within tube 6SN7 or as designated in Fig. 5, tube V4.

The initial value of the clip level 111 can be set manually by changing the width of the output of clip level multivibrator 18. This adjustment is usually made by observing the number of quantized noise pulses 113 on the slowed-down video plan position indicator or, as abbreviated, P.P.I. (not shown). Because of the long time constant in the integrator 20, this process is long compared to previous attempts to automatically regulate a radar system for video noise. However, the adjustment only need be made when a major change in receiver gain is made, and with practice the time constant can be substantially reduced. Not much else can be done to reduce the time constant of integration because of the high gain necessitated by feedback path. The presence of a target or piece of ground clutter in the gate 14 would raise the clip level 111 too much if the time constant were substantially reduced.

Other tubes, voltage magnitudes and circuit components may be used in place of those shown in Fig. 5. The specific components as shown and described in the present embodiment are for illustrative purposes only, and it is not intended that my invention be limited thereto.

I claim:

1. Computer control circuitry including, in combination, a signal input circuit, means for clipping the voltage peaks of said signal input circuit, means for converting the output of said clipping means into digital pulses, said converting means comprising a flip-flop component triggered by said voltage peaks, a pulser for generating timing mark pulses at predetermined intervals, a gate component opened by the triggered flip-flop component to permit the next timing mark pulse through said gate component, means for delaying the output of said gate component for a predetermined interval, means for regenerating the delayed output of said gate component wherein the output digital pulses of said regenerating means is transmitted to actuate said means for controlling the clip level of said clipping means, and said regenerating means also serving to reset said flip-flop component for subsequent triggering action.

2. The computer control circuitry as defined in claim 1, wherein the means for controlling the clip level of the said clipping means comprises, a gate means, trigger pulse input means, a gate delay means actuated by said trigger pulses for generating pulses of predetermined duration and at predetermined intervals, said gate means being operative to open to one of said output digital pulses of said regenerating means if said last-named pulse is in synchronism with the pulse generated by said gate delay means, whereby the output of said gate means is fed back to control the clip level of said clipping means.

3. The computer control circuitry as defined in claim 2 and further comprising a clip level delay means triggered by the output pulses of said gate means for generating pulses at predetermined intervals, means for inverting and amplifying the output pulses of said clip level delay means, means for integrating the output of said inverting and amplifying means into a D.C. voltage wherein said integrated D.C. voltage is fed to control the clip level of said clipping means maintaining substantial constancy of signal content.

4. An automatic clip control circuit for a radar system including video input signal means and visual indicating means, comprising means for clipping the peaks of said video input signals, means for converting the output of said clipping means into quantized digital pulses, means for feeding said quantized digital pulses to said indicating means, means for generating radar trigger pulses, gate delay means for generating pulses of predetermined duration and spacing actuated by and in accordance with the frequency of said radar trigger pulses, means for gating said quantized digital pulses when a pulse from said gate relay means is in synchronism with a quantized digital pulse means for inverting and amplifying the output of said gate means, and means for integrating the output of said inverted and amplified pulse wherein a D.C. voltage is generated to be fed back to said clipping means to regulate the clip level of subsequenlty received video input signals and maintain the content of said quantized video pulses substantially constant.

5. Apparatus for maintaining the quantized noise of video signals received by a radar system substantially constant regardless of variations of the video noise level, comprising means for clipping the peaks of said received video signals, means for converting the output of said clip video signals into digital pulses, means for gating said digital pulses in accordance with delayed radar trigger input signals, means for inverting and amplifying the output of the gating action and integrating the inverted and amplified signal wherein a D.C. voltage is generated, and means for feeding back said D.C. voltage to regulate the input video signals to maintain substantial signal input constancy.

References Cited in the file of this patent

UNITED STATES PATENTS

| | | |
|---|---|---|
| 2,144,995 | Pulvari-Pulvermacher | Jan. 24, 1939 |
| 2,353,018 | Duke | July 4, 1944 |
| 2,490,530 | Loughlin | Dec. 6, 1949 |
| 2,502,454 | Grieg | Apr. 4, 1950 |

FOREIGN PATENTS

| | | |
|---|---|---|
| 586,284 | Great Britain | Mar. 13, 1947 |